Patented Apr. 5, 1927.

1,623,070

UNITED STATES PATENT OFFICE.

LUDWIG ROSENSTEIN, OF SAN FRANCISCO, CALIFORNIA.

PROCESS FOR REMOVING SULPHUR DIOXIDE AND COMPOUNDS FROM FOOD PRODUCTS.

No Drawing.   Application filed March 18, 1926.   Serial No. 95,799.

This invention relates to a process for the removal of sulphur dioxide or compounds thereof from dried fruits and other food products which have been treated at some stage of their preparation for the market with sulphur dioxide.

As is well known, the appearance and keeping quality of dried fruits are greatly improved by treatment with sulphur dioxide (usually called sulphuring or bleaching), prior to their being dried. However, excessive quantities of sulphur dioxide or compounds must not be allowed to remain in the finished products, as these are considered harmful, and are in fact, strictly limited by certain governments.

I have found that sulphur dioxide thus ordinarily retained in the fruit may be effectively removed to any desired extent from the sulphured product by utilizing the reaction which sulphur dioxide or sulphites undergo when brought in contact with a peroxide such as hydrogen peroxide. By this reaction the sulphur dioxide or sulphite is oxidized to sulphate which latter is entirely harmless in food products and against which there is no legislation either in this country or abroad so far as is known to applicant.

When sodium peroxide is used as the peroxide compound, the reaction is:

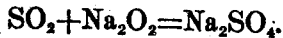

$$SO_2 + Na_2O_2 = Na_2SO_4.$$

Or, if hydrogen peroxide is used, the reaction is:

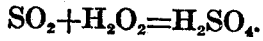

$$SO_2 + H_2O_2 = H_2SO_4.$$

While this latter reaction indicates the formation of sulphuric acid which might be considered as a harmful ingredient, this compound need not actually be formed. The addition of a mild alkali such as sodium bicarbonate during the treatment prevents it, though in many cases, sufficient salts of weak acids are normally present in the fruit to react with the small amount of sulphuric acid first formed and thereby render it harmless.

The following description indicates one method of carrying out my invention: A certain sample of dried apricots showed on analysis the presence of 400 milligrams of sulphur dioxide per kilogram. Preliminary tests also showed that the fruit would retain on its surface approximately 18% of its weight of water when dipped therein and rapidly removed; in other words one kilogram would retain 180 grams of water. Furthermore, calculation showed that 212 milligrams of hydrogen peroxide would be needed to react with all of the sulphur in 1 kilogram of said fruit. A quantity of aqueous solution was prepared containing 212 milligrams of $H_2O_2$ in every 180 grams of the solution together with a small amount of sodium bicarbonate. The fruit was dipped into this solution, at once removed and allowed to dry. On analysis it was found to contain less than 80 milligrams of $SO_2$ per kilogram.

I do not mean to limit my invention to the above described dipping method. The peroxide solution may be applied by spraying, dripping, or any other means; nor need the quantity of peroxide applied to the fruit be such as to be chemically equivalent to the sulphur dioxide contained therein, but may be either more or less than this amount; nor is the addition of sodium bicarbonate or other alkali necessary in all cases.

Peroxides other than hydrogen peroxide, but having a similar action with sulphur dioxide or sulphites may be used, and of course any soluble salts formed may be washed away with water if desired.

I claim:

1. The process for removing undesirable sulphur compounds from dried fruit which comprises subjecting the fruit to the action of hydrogen peroxide.

2. The process for removing undesirable sulphur compounds from dried fruit which comprises subjecting the fruit to the action of hydrogen peroxide in aqueous solution.

3. The process for removing undesirable sulphur compounds from dried fruit which comprises subjecting the fruit to the action of hydrogen peroxide in aqueous solution by dipping the fruit therein.

4. The process for removing undesirable sulphur compounds from dried fruit which comprises subjecting the fruit to the action of hydrogen peroxide in aqueous solution by dipping the fruit therein for a brief space of time and permitting subsequent action on the fruit of the liquid adhering thereto.

5. The process for removing undesirable sulphur compounds from dried fruit which comprises subjecting the fruit to the action of hydrogen peroxide in aqueous solution by dipping the fruit therein for a brief space of time and permitting subsequent action on the fruit of the liquid adhering thereto, the active chemical in the amount of liquid adhering to the fruit being so proportioned as to react with the quantity of sulphur compound it is desired to remove from the fruit.

6. The process for removing undesirable sulphur compounds from dried fruit which comprises applying to the surface of the fruit an aqueous solution of a peroxide and an alkali.

7. The process for removing undesirable sulphur compounds from dried fruit which comprises applying to the surface of the fruit an aqueous solution of hydrogen peroxide and sodium bicarbonate.

8. The process for removing undesirable sulphur compounds from dried fruits which comprises subjecting the fruit to the action of a non-poisonous peroxide adapted to react therewith.

9. The process for removing undesirable sulphur compounds from dried fruits which comprises subjecting the fruit to the action of a non-poisonous peroxide in aqueous solution adapted to react therewith.

LUDWIG ROSENSTEIN.